(12) United States Patent
Wentink et al.

(10) Patent No.: US 7,990,902 B2
(45) Date of Patent: Aug. 2, 2011

(54) FACILITATING TRANSMISSIONS IN A PLURALITY OF PROTOCOLS

(75) Inventors: Menzo Wentink, Utrecht (NL); Trent Carter, Indiatlantic, FL (US)

(73) Assignee: Conexant Systems, Inc., Newport Beach, CA (US)

( * ) Notice: Subject to any disclaimer, the term of this patent is extended or adjusted under 35 U.S.C. 154(b) by 866 days.

(21) Appl. No.: 11/871,515

(22) Filed: Oct. 12, 2007

(65) Prior Publication Data

US 2008/0089261 A1    Apr. 17, 2008

Related U.S. Application Data

(60) Provisional application No. 60/851,648, filed on Oct. 13, 2006, provisional application No. 60/875,739, filed on Dec. 19, 2006.

(51) Int. Cl.
*G08C 17/00* (2006.01)
*H04B 7/00* (2006.01)

(52) U.S. Cl. .................................. 370/311; 455/41.2

(58) Field of Classification Search .................. 370/311, 370/338, 469, 395.5; 455/41.2
See application file for complete search history.

(56) References Cited

U.S. PATENT DOCUMENTS

| | | | |
|---|---|---|---|
| 2002/0061031 A1 | 5/2002 | Sugar et al. | |
| 2005/0025104 A1 | 2/2005 | Fischer et al. | |
| 2005/0047358 A1* | 3/2005 | Pattabiraman et al. | 370/311 |
| 2005/0135295 A1 | 6/2005 | Walton et al. | |
| 2005/0136913 A1 | 6/2005 | Kampen et al. | |
| 2005/0169201 A1* | 8/2005 | Huylebroeck | 370/311 |
| 2005/0187001 A1 | 8/2005 | Fishel | |
| 2005/0237984 A1 | 10/2005 | Benveniste | |
| 2005/0249137 A1* | 11/2005 | Todd et al. | 370/311 |
| 2006/0120314 A1* | 6/2006 | Krantz et al. | 370/311 |
| 2006/0140140 A1* | 6/2006 | Fuccello | 370/311 |
| 2006/0211372 A1* | 9/2006 | Shellhammer et al. | 455/41.2 |
| 2006/0252443 A1 | 11/2006 | Sammour et al. | |

OTHER PUBLICATIONS

Written Opinion and Search Report in related, co-pending PCT Application No. PCT/US07/86003, mailed May 7, 2008.
Written Opinion and Search Report in related, co-pending PCT Application No. PCT/US07/83150, mailed May 20, 2008.
IEEE Std 802.15.2-2003—Part 15.2: Coexistence of Wireless Personal Area Networks with Other Wireless Devices Operating in Unlicensed Frequency Bands, Aug. 28, 2003.

* cited by examiner

*Primary Examiner* — Brian D Nguyen
(74) *Attorney, Agent, or Firm* — Thomas, Kayden, Horstemeyer & Risley, LLP

(57) ABSTRACT

Included are embodiments for sending data in an environment with a plurality of protocols. At least one embodiment of a method includes receiving, at a communications device, an indication to send first data to an access point in a first communications protocol and determining that second data is being communicated in a second communications protocol. Some embodiments include determining a period of silence from data communication in the second communications protocol and sending the first data in the first communications protocol during the period of silence.

21 Claims, 10 Drawing Sheets

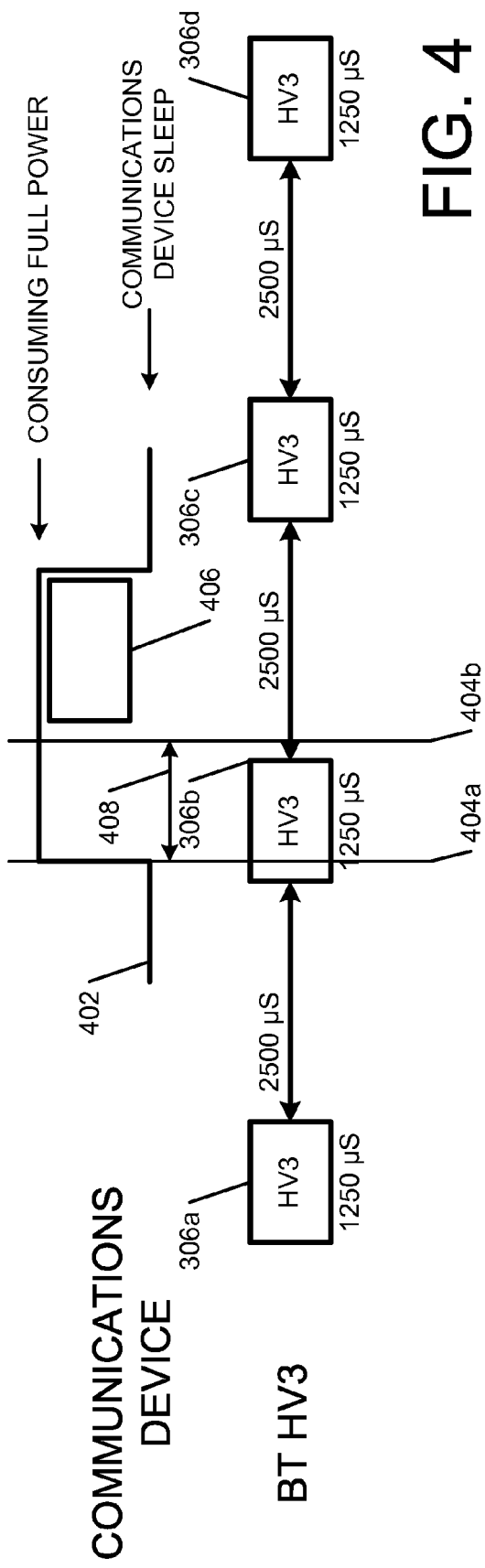
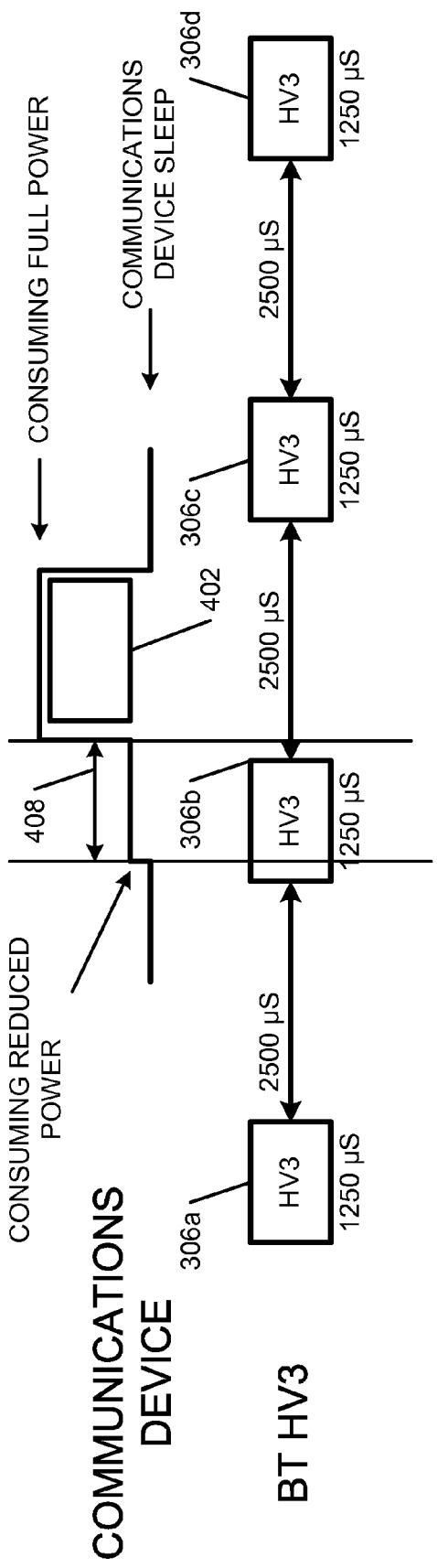

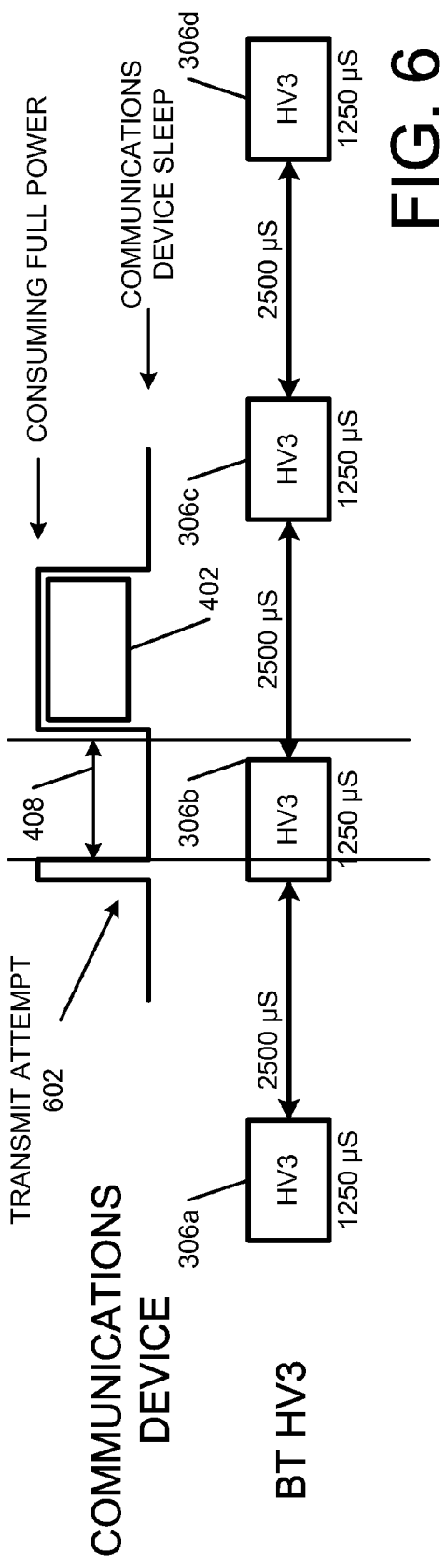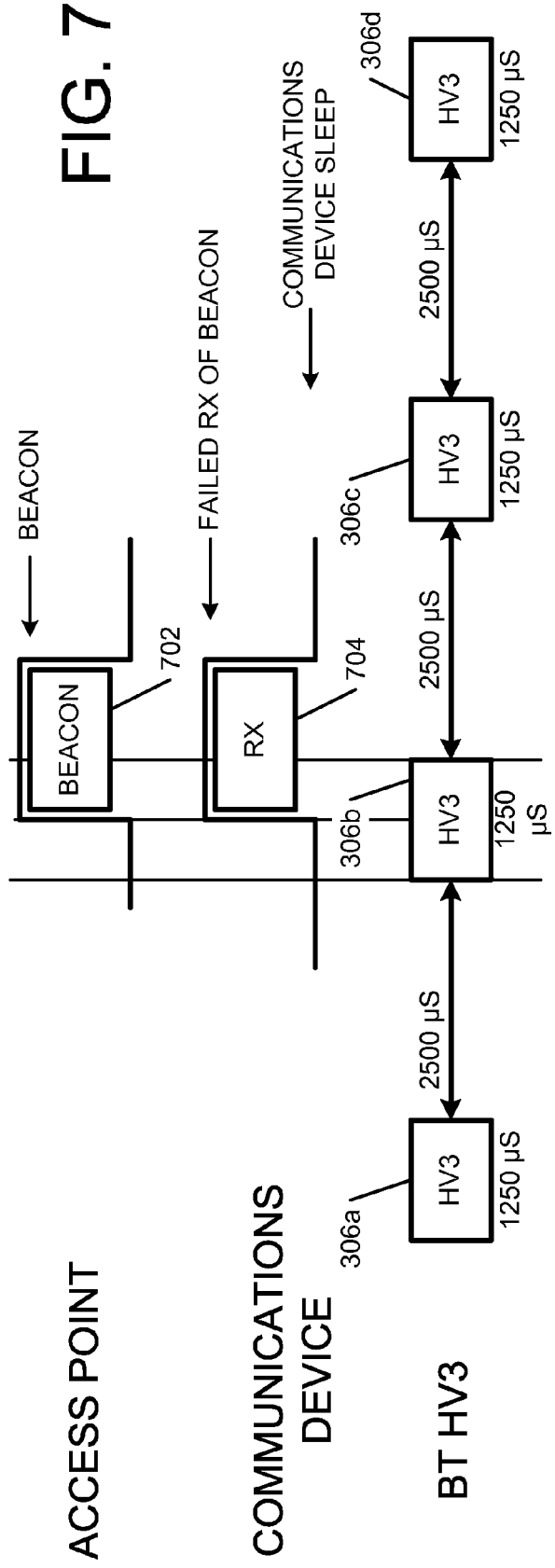

US 7,990,902 B2

FACILITATING TRANSMISSIONS IN A PLURALITY OF PROTOCOLS

CROSS REFERENCE

This application claims the benefit of U.S. Provisional Application No. 60/851,648, filed Oct. 13, 2006 and U.S. Provisional Application No. 60/875,739, filed Dec. 19, 2006, each of which is hereby incorporated by reference in its entirety.

BACKGROUND

As wireless communications have evolved, various protocols have been developed to provide different features. As many devices are now configured to communicate using different wireless protocols, interference can occur when the protocols operate in similar and/or overlapping frequencies during a similar time period. As such, interference can distort and/or inhibit a communication. Additionally, as wireless communications utilize portable power sources, improving power utilization efficiency is also desirable.

SUMMARY

Included are embodiments for sending data in an environment with a plurality of protocols. At least one embodiment of a method includes receiving, at a communications device, an indication to send first data to an access point in a first communications protocol and determining that second data is being communicated in a second communications protocol. Some embodiments include determining a period of silence from data communication in the second communications protocol and sending the first data in the first communications protocol during the period of silence.

Also included are embodiments of a device. At least one embodiment of a device includes first determining logic configured to determine that an access point will send first data to the communications device in a first protocol and second determining logic configured to determine that a Bluetooth device is transmitting second data in a second protocol. At least one embodiment includes third determining logic configured to determine a transmission schedule for the Bluetooth device for transmitting the data in the second device and first sending logic configured to send, to the access point, an indication of the determined transmission schedule for transmitting the second data in the second protocol.

Also included are embodiments of a system. At least one embodiment of a system includes a receiving component configured to receive an indication to transmit first data to an access point in a first communications protocol, the first protocol operating at a first frequency and a first determining component configured to determine that second data is being communicated in a second communications protocol, wherein the second communications protocol operates at a second frequency, the second frequency configured to interfere with the first frequency, the second data being communicated at regular intervals. Some embodiments include a second determining component configured to determine a period of silence from data communication in the second protocol and a sending component configured to send the first data in the first communications protocol during the period of silence.

Other systems, methods, features, and/or advantages of this disclosure will be or may become apparent to one with skill in the art upon examination of the following drawings and detailed description. It is intended that all such additional systems, methods, features, and advantages be included within this description and be within the scope of the present disclosure.

BRIEF DESCRIPTION

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, there is no intent to limit the disclosure to the embodiment or embodiments disclosed herein. On the contrary, the intent is to cover all alternatives, modifications, and equivalents.

FIG. 4 is a diagram illustrating an exemplary embodiment of delaying the communication of data until a Bluetooth packet is transmitted, such as with the communications device from FIG. 2.

FIG. 5 is a diagram illustrating an exemplary embodiment of utilizing a reduced power mode for communicating data between Bluetooth packets, similar to the diagram from FIG. 4.

FIG. 6 is a diagram illustrating an exemplary embodiment of utilizing a transmit attempt to determine a Bluetooth schedule for reducing interference in data communication, similar to the diagram from FIG. 5.

FIG. 7 is a diagram illustrating an exemplary embodiment of interference between an access point and a Bluetooth device, similar to the diagram from FIG. 6.

DETAILED DESCRIPTION

Figure 1:
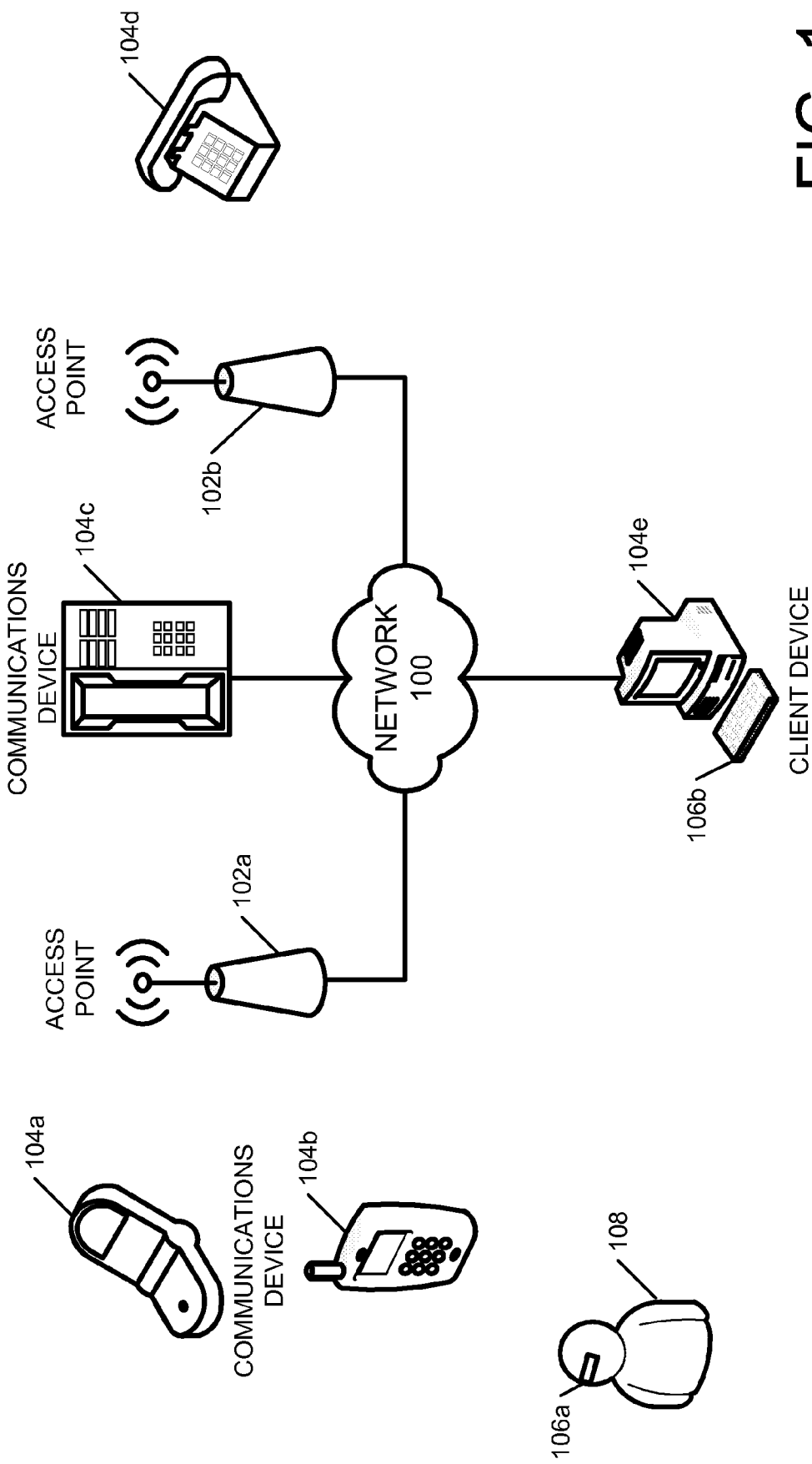
FIG. 1 is a diagram illustrating an exemplary embodiment of a network configuration that may be utilized for wireless communications.

FIG. 1 is a diagram illustrating an exemplary embodiment of a network configuration that may be utilized for wireless communications. As illustrated in the nonlimiting example from FIG. 1, network 100 may be coupled to access points 102*a* and 102*b*. Access points 102*a* and 102*b* can be configured to provide wireless communications to communication devices 104*a*, 104*b*, 104*c* and/or 104*d*. More specifically, depending on the particular configuration, access points 102*a* and/or 102*b* may be configured for providing WIFI services, WiMAX services, wireless SIP services, Bluetooth services and/or other wireless communication services. Additionally, communication device 104*b* may be coupled to network 100 (via a wired and/or wireless connection) for storing communications between communication device 104*e* and/or another communication device 104 coupled to network 100.

Network 100 may include a Public Switched Telephone Network (PSTN), a Voice over Internet Protocol (VoIP) network, an Integrated Services Digital Network (ISDN), a cellular network, and/or other mediums for communicating data between communication devices. More specifically, while communications devices 104*a* and 104*b* may be configured for WIFI communications, a communications device 104*e* may be coupled to network 100 and may facilitate communication between users on a communications device 104*a* and users on a communications device 104*e*, even though communications device 104*e* may be configured for PSTN communications, as opposed to VoIP communications. Additionally, while a communications device 104*a* may be configured to communicate with communications device 104*d* via a WIFI or IEEE 802.11 (e.g., 802.11b, 802.11g, 802.11n, etc.) protocol, communications device 104*b* may also be able to communicate with a wireless ear piece 106*a* being utilized by a user 108 and/or other device using a Bluetooth protocol. Similarly, the communications device 104*e* may be configured to communicate with wireless keyboard 106*b* via a Bluetooth protocol. These and other Bluetooth enabled devices (referred to herein as Bluetooth device 106) may also be utilized in the configuration of FIG. 1. As these protocols may be configured to operate in similar frequencies, utilization of these protocols concurrently may cause data interference, thereby reducing the quality of each communication.

Figure 2:
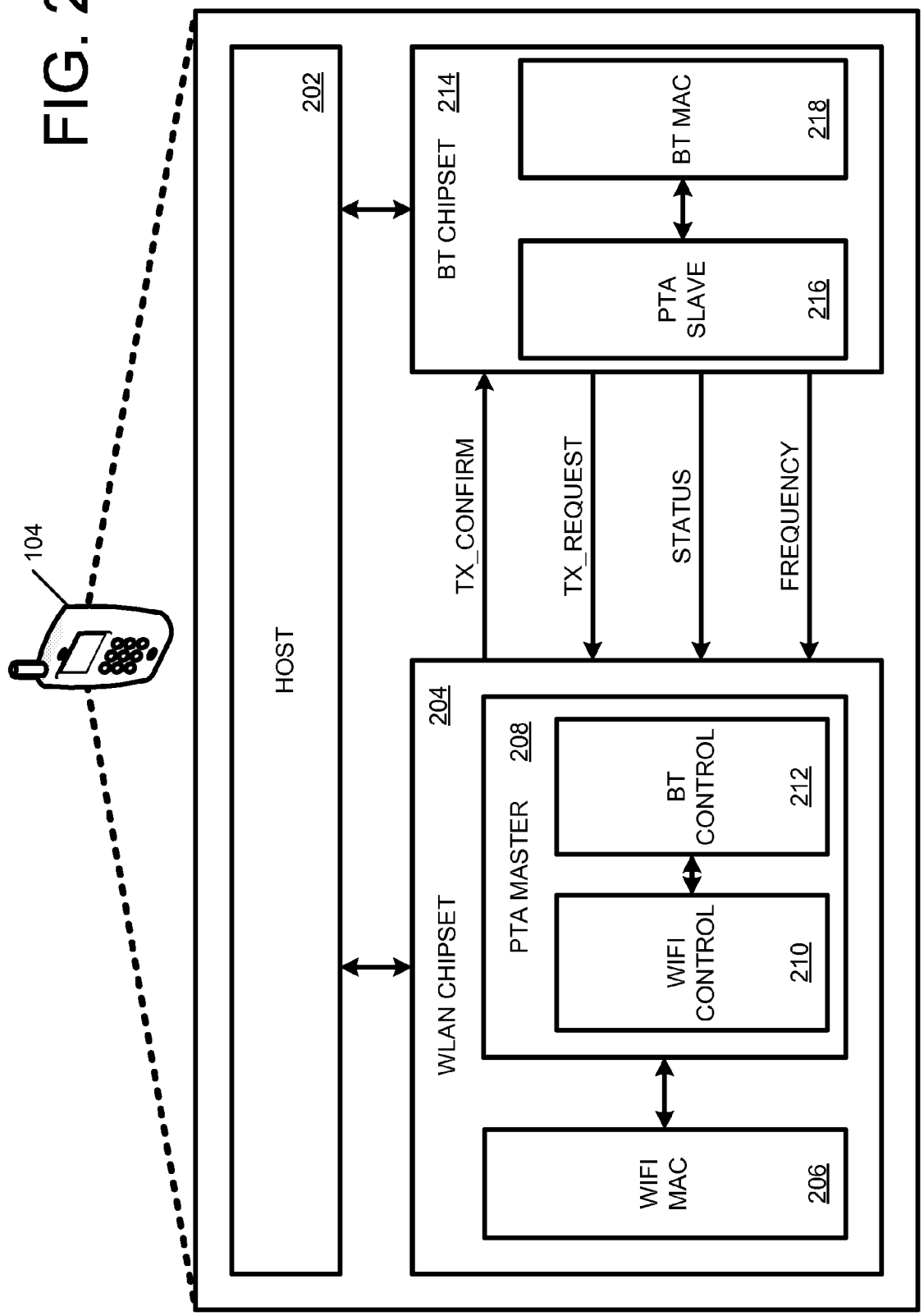
FIG. 2 is a diagram illustrating an exemplary embodiment of a communications device that may be configured to operate in the network from FIG. 1.

FIG. 2 is a diagram illustrating an exemplary embodiment of a communications device 104 that may be configured to operate in the network from FIG. 1. As illustrated in the nonlimiting example of FIG. 2, the communications device 104 may include a host 202. Additionally included is a Wireless Local Area Network (WLAN) chipset 204, which may include a WIFI Media Access Control (MAC) and a Packet Traffic Arbitration (PTA) master 208. The PTA master 208 can include a WIFI control component 210 and a Bluetooth (BT) control component 212.

Also included with the communications device 104 is a Bluetooth chipset 214. The Bluetooth chipset 214 may include a PTA slave component 218 and a Bluetooth MAC component 218. The WLAN chipset 204 and the Bluetooth chipset 214 may be configured to communicate data signals to coordinate various protocols such as 802.11 data and Bluetooth data. At least a portion of the signals are included in Table 1, below.

TABLE 1

Signals communicated in a communications device 104

| Pin name | Data direction | Description |
| --- | --- | --- |
| Tx_request | BT to WLAN | May be asserted during Bluetooth (BT) receive or transmit. On receipt of a tx_request signal, the 802.11 control may generate a tx_confirm signal containing a status value that is either allowed or denied. |

TABLE 1-continued

Signals communicated in a communications device 104

| Pin name | Data direction | Description |
| --- | --- | --- |
| Status | BT to WLAN | Pulsed if a BT slot is high priority. After pulsing, indicates BT radio mode (transmit or receive). |
| Tx_confirm | WLAN to BT | Transmission confirmation. De-asserted when the PTA modules attempt to prevent the BT module transmission. The BT module may not initiate a transmission when the tx_confirm is de-asserted, as sampled before the start of the slot, but may continue transmission if asserted during the slot. In response to a tx_request signal, Bluetooth control may generate a tx_confirm signal that includes a status value that is either allowed or denied. |
| Frequency | BT to WLAN | This optional frequency overlap signal is asserted when the BT transceiver hops into restricted channels that are defined by a coexistence mechanism. |

In operation, the Bluetooth chipset 214 may send a tx_request to the PTA master 208, indicating a request to transmit Bluetooth data. The PTA master 208 can respond with an indication to transmit or to refrain from transmitting at this time (e.g., tx_confirm). The Bluetooth data may then be transmitted. A status signal may be sent from the Bluetooth chipset 214 to the PTA master 204 if the data to be transmitted is determined to be high priority data. Additionally, as discussed in more detail below, the communications device 104 may also be configured for dynamic fragmentation, delayed transmission, and/or other actions, depending on the particular configuration.

One should also note that, while not explicitly illustrated in FIG. 2, communications device 104 may include other components, such as a processor, display interface, input interface, output interface, data storage, local interface (e.g., a bus), one or more memory components, such as RAM, DRAM, flash memory, and/or other volatile and nonvolatile memory components. Additionally, the communications device 104 may include one or more programs (embodied in software, hardware, firmware, etc.) for execution by the processor. The programs may be located with the memory components, data storage, and/or elsewhere. Other components may be included that facilitates communication of data with the communications device 104.

One should also note that components illustrated in FIG. 2 are included for purposes of illustration and are not intended to limit the scope of this disclosure. More specifically, while PTA master 208 is illustrated as residing in the WLAN chipset 204, this is a nonlimiting example. More specifically, in at least one embodiment, the PTA master 208 may reside on an Application Specific Integrated Circuit (ASIC), at the host, and/or elsewhere. Similarly, other components described with respect to the communications device 104 may differ in practice, depending on the particular configuration.

Figure 3:
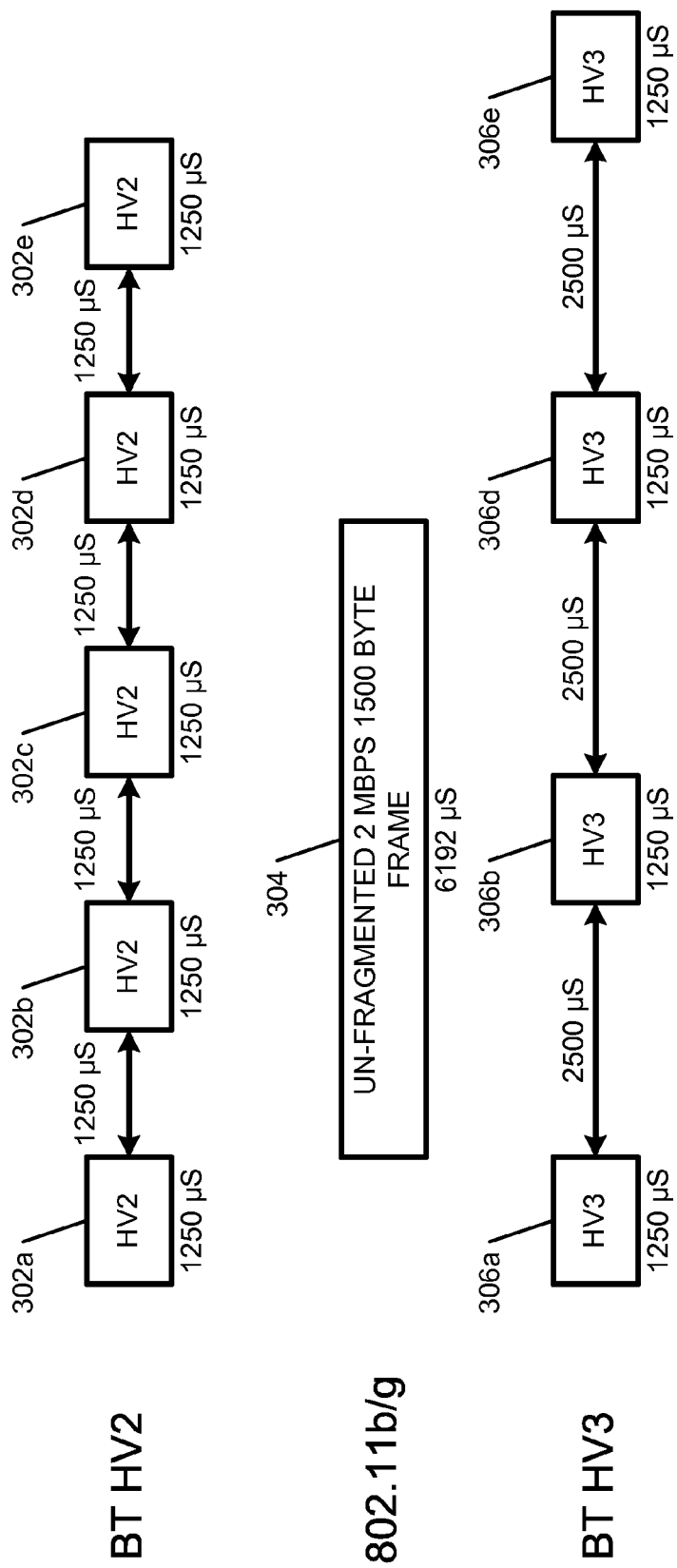
FIG. 3 is a diagram illustrating an exemplary embodiment of data frames, such as may be communicated by the device from FIG. 2.

FIG. 3 is a diagram illustrating an exemplary embodiment of data frames, such as may be communicated by the device 104 from FIG. 2. More specifically, as illustrated in the nonlimiting example of FIG. 3, Bluetooth voice variant High Quality Voice 2 (HV2) may be configured to transmit data packets that are 1250 μs in length. Additionally, HV2 data frames 302*a*-302*e* may be sent at 1250 μs intervals, with data frames 302*a* and 302*b*, 302*b* and 306*c*, etc being consecutively transmitted data frames. 802.11 data frames 304, on the other hand may include one or more frames that may be configured to be sent at regular or irregular intervals. Bluetooth HV3 data frames 306a-306e, span 1250 μs may be sent at regular intervals of 2500 μs, with data frames 306a and 306b, 306b and 306c, etc. being consecutively transmitted data frames.

One should note that, depending on the particular configuration, the interval times and/or data frame times may differ than those described with regard to FIG. 3. Similarly, the amount of data transmitted in a data frame may differ, depending on the particular configuration. The values given for these parameters are included for purposes of illustration and are not intended to limit the scope of this disclosure.

FIG. 4 is a diagram illustrating an exemplary embodiment of delaying the communication of data until a Bluetooth packet is transmitted, such as with the communications device 104 from FIG. 2. As illustrated in the nonlimiting example of FIG. 4, a Bluetooth device 106 may be configured to communicate HV3 data 306a-306d (or other data). As discussed above, the HV3 data 306 may span 1250 μs, with a 2500 μs time between consecutive frames. Additionally, a communications device 104 may receive an instruction to send data to (and/or receive data from) an access point 102. To save power (and conserve battery), the communications device 104 may enter a sleep mode, as indicated with line 402. The sleep mode is a mode where much of the circuitry is shut down to prevent unnecessary power consumption.

In this nonlimiting example, the communications device 104 resumes normal power mode as indicated by vertical line 404a. During this time, a Bluetooth frame is being communicated. As Bluetooth and 802.11b/g may communicate at similar frequencies, interference may occur if the communications device 104 transmits and/or receives an 802.11b/g data frame at this time. As such, the communications device 104 may delay communication and/or receipt of the data 406 until after the HV3 data frame 306 has been transmitted. The 802.11b/g data frame can thee be transmitted before the HV3 frame 306c is transmitted.

While such a configuration may reduce interference between Bluetooth communications and 802.11b/g communications, such a configuration may unnecessarily consume power, as the communications device 104 may be operating in full power mode while waiting for the HV3 frame to finish transmission (see indicator 408). As such, the operation of the communications device 104 may be hindered.

FIG. 5 is a diagram illustrating an exemplary embodiment of utilizing a reduced power mode for communicating data between Bluetooth packets, similar to the diagram from FIG. 4. As illustrated in the nonlimiting example of FIG. 5, the HV3 frames 306 are being transmitted at a synchronous rate. However, in this nonlimiting example, the communications device may have a reduced power mode in addition to the full power mode and the sleep mode. The communications device 104 can enter the reduced power mode to determine whether transmission can commence without interference. More specifically, the communications device 104 can enter the reduced power mode by powering off unnecessary components of the communications device 104. As a nonlimiting example, the communications device 104 can power off a transceiver, base band processor, host interface, and/or other components. This can reduce power consumption by the communications device 104 and still facilitate the data transmission of data frame 402 when Bluetooth frame 306b is complete.

FIG. 6 is a diagram illustrating an exemplary embodiment of utilizing a transmit attempt to determine a Bluetooth schedule for reducing interference in data communication, similar to the diagram from FIG. 5. As illustrated in the nonlimiting example of FIG. 6, the Bluetooth data frames 306a-306d may be transmitted in a regular pattern with 2500 μs between frames. However, in this configuration, the communications device 104 can attempt to transmit data and thus, enter full power mode from sleep mode. Upon entering full power mode, the communications device 104 can determine that the Bluetooth frame 306b is being transmitted and determine when the transmission will be complete. The communications device 104 can then return to sleep mode (see indicator 408) until the determined time. Upon reaching the determined time, the communications device 104 can return to the full power mode and transmit data 402.

Additionally, interference may occur when the access point 102 transmits data to the communications device 104 during a Bluetooth data transmission. In at least one embodiment, the access point 102 may not be controlled by nor have access to the PTA signaling. If the access point 102 transmits data during Bluetooth communication, there is a high probability of interference. If the transmission is a data frame, this collision may result in the access point 102 extending a collision window and/or reducing a transmission rate. The reduction in transmission rate can increase the transmission time of the retransmission of an error frame, further increasing the chance of a further collision. If the transmission rate is reduced too much, the access point 102 transmission may not fit into the time allowed between HV2/HV3 frames.

The effect of these collisions can be measured in a reduced throughput on data traffic due to increased packet error rate. Similarly the access point 102 can reduce its transmission rate because of the increased packet error rate. This effect can multiply because reduced transmission rates may yield longer frames. Longer frames are more likely to be interfered by the Bluetooth data, thus causing the access point 102 to reduce its transmission rate further. Similarly, the access point 102 can increase its collision window. The collision window may be used to calculate a backoff window for the next transmission. This increase in the collision window and backoff window can reduce the transmission rate of the access point 102, as measured in throughput.

There is also the situation where an expected Beacon transmission time (TBTT) of the access point 102 falls during an expected Bluetooth HV2/HV3 frame. This can result in the Beacon not being received by the communications device 104 because of the collision or because the Bluetooth and 802.11b/g radios are sharing an antenna and the antenna was switched to the Bluetooth device 106. This lost beacon can cause one or more issues. More specifically, during the communications device 104 sleep mode, the beacon contains vital information about buffered data waiting for the communications device 104 in the access point 102 memory. This information may be communicated via the traffic indication map (TIM) field in the beacon. If the beacon is not received, this information is not available to the communications device 104 and can result in excessive delays in the reception of the data. This delayed reception can result in the access point 102 purging this data from its buffers and the data never being delivered. Similarly, the delayed data can have adverse effects on time critical applications including voice over Internet protocol (VoIP), video streaming, audio, and/or other data.

FIG. 7 is a diagram illustrating an exemplary embodiment of interference between an access point and a Bluetooth device, similar to the diagram from FIG. 6. As illustrated in the nonlimiting example of FIG. 7, the access point 102 can transmit a beacon 702 to the communications device 104. However, because a Bluetooth frame is being transmitted during that time, interference may occur and the communications device 104 may not be able to receive the frame 704. Thus, not only is the communication unsuccessful, but the communications device 104 wastes unnecessary power by attempting to receive the data frame 704.

Figure 8:
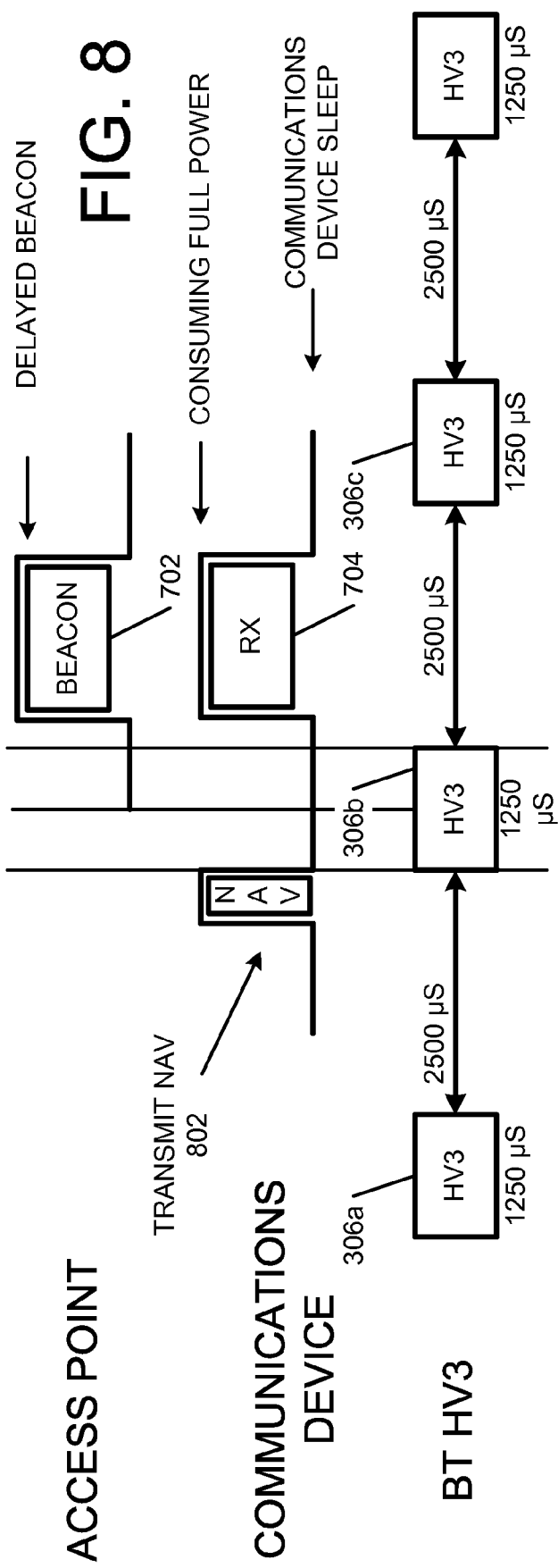
FIG. 8 is a diagram illustrating an exemplary embodiment of utilizing a Network Allocation Vector (NAV) to reduce power consumption in a communications device, similar to the diagram from FIG. 7.

FIG. 8 is a diagram illustrating an exemplary embodiment of utilizing a Network Allocation Vector (NAV) to reduce power consumption in a communications device, similar to the diagram from FIG. 7. As illustrated in the nonlimiting example of FIG. 8, the communications device 104 can transmit a network allocation vector (NAV) 802 to the access point 102. More specifically, in at least one exemplary embodiment, the communications device 104 may be configured to set a Network Allocation Vector (NAV) 802 on an uplink trigger frame, which covers a time equal to or longer than the Bluetooth frame transmission time (e.g., 1250 μs). During the NAV time, no transmissions will be started, and the communications device 104 may enter the sleep mode by powering off the receiver and possibly other components. The NAV 802 also reduces the probability that another transmission may capture the medium before the access point starts a downlink response transmission, and may allow the access point 102 to access the medium without contention.

Upon sending the NAV 802 to the access point 102, the communications device 104 can enter the sleep state until the Bluetooth frame transmission is complete. The access point 102 can then send the beacon 702 to the communications device 104 after the Bluetooth data transmission is complete. The communications device 104 can receive the data 704 without interference and without expending unnecessary power.

Figure 9:
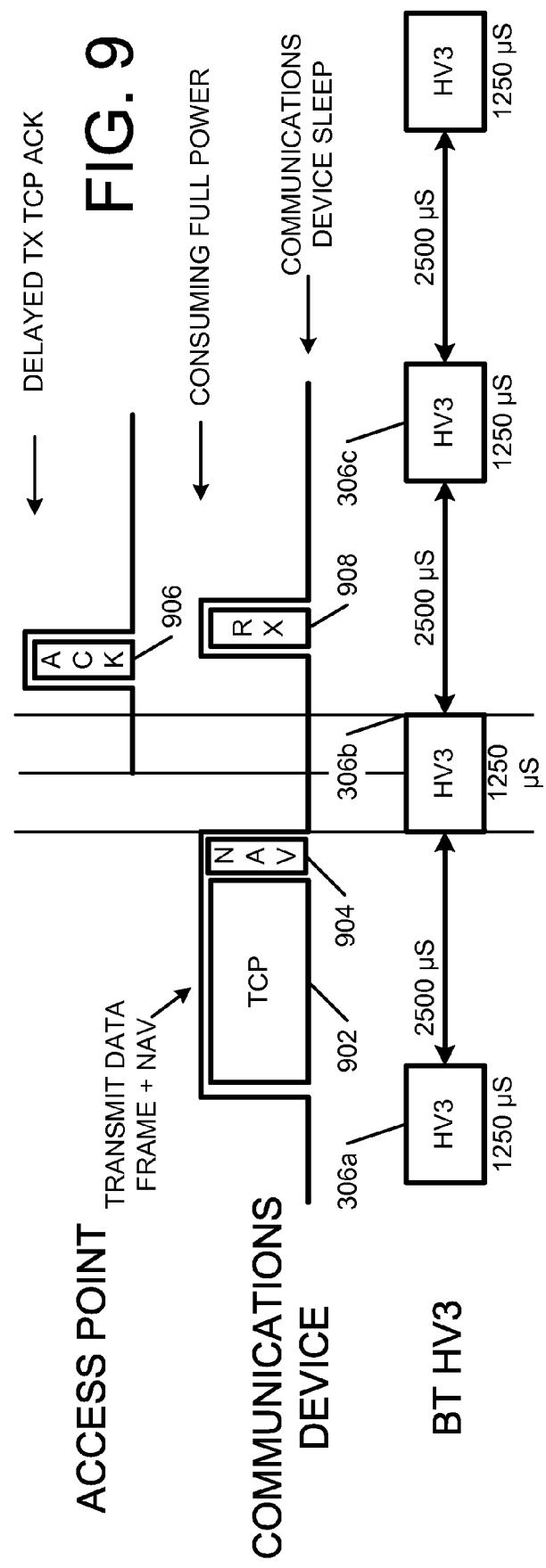
FIG. 9 is a diagram illustrating an exemplary embodiment of utilizing a NAV to avoid interference between a TCP acknowledgement and Bluetooth frame transmission, similar to the diagram from FIG. 8.

FIG. 9 is a diagram illustrating an exemplary embodiment of utilizing a NAV to avoid interference between a TCP acknowledgement and Bluetooth frame transmission, similar to the diagram from FIG. 8. As illustrated in the nonlimiting example of FIG. 9, the communications device 104 can transmit a TCP data frame 902 and a NAV 904 to an access point during a break in Bluetooth communications. More specifically, the communications device 104 can calculate the Bluetooth timing and synchronize a timer in the communication device 102. This timing data can then be included with the NAV 904 for sending to the access point 102. The NAV can be sent on a CTS frame and/or a null frame.

As discussed with reference to FIG. 8, the NAV may be configured to indicate a time to respond with an acknowledgement frame 906 such that interference with the Bluetooth data is reduced. Upon receiving the TCP frame 902 and NAV 904, the access point 102 can determine when to send the acknowledgement frame 906. Additionally, the communications device 104 can return to sleep mode until expected transmission of the acknowledgement frame 906 occurs. The communications device 104 can then resume normal power mode to receive the acknowledgement, as indicated with RX frame 908.

One should note that setting a NAV does not require sending a frame to the access point 102. As a nonlimiting example, a clear to send (CTS) frame may be addressed to itself and accomplish a similar result. Additionally, a duration field may be utilized as a broadcast field. As such, sending data to the access point 102 may include scenarios where the data is addressed to the access point 102 and scenarios where the data is not addressed to the access point. Additionally, as illustrated, the NAV may be configured to be sent on a separate data frame from the TCP data, just before and/or after the TCP data.

Figure 10:
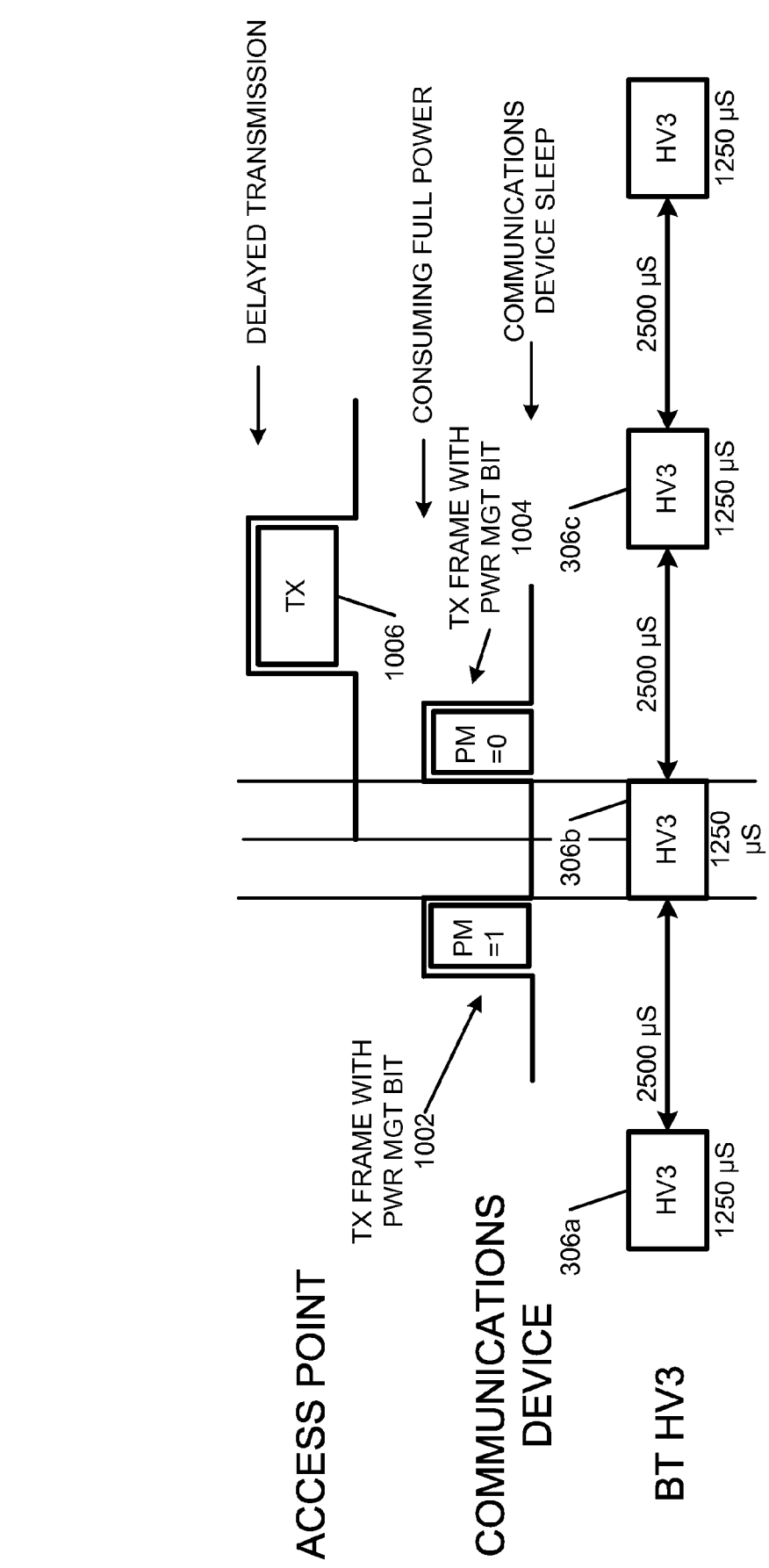
FIG. 10 is a diagram illustrating an exemplary embodiment of utilizing a power management bit for reducing power consumption in a communications device, similar to the diagram from FIG. 9.

FIG. 10 is a diagram illustrating an exemplary embodiment of utilizing a power management bit for reducing power consumption in a communications device, similar to the diagram from FIG. 9. As illustrated in the nonlimiting example of FIG. 10, the communications device 104 can determine the transmission timing of Bluetooth data. The communications device 104 can additionally send a power management bit 1002 to the access point 102. The communications device 104 can then enter asleep mode. After the Bluetooth data 306*b* has been transmitted, the communications device can send the power management bit 1004. The access point 102 will then know that it can transmit the desired data frame 1006. The communications device 104 can then remain in sleep mode until the expected time for receiving data from the access point 102.

Figure 11:
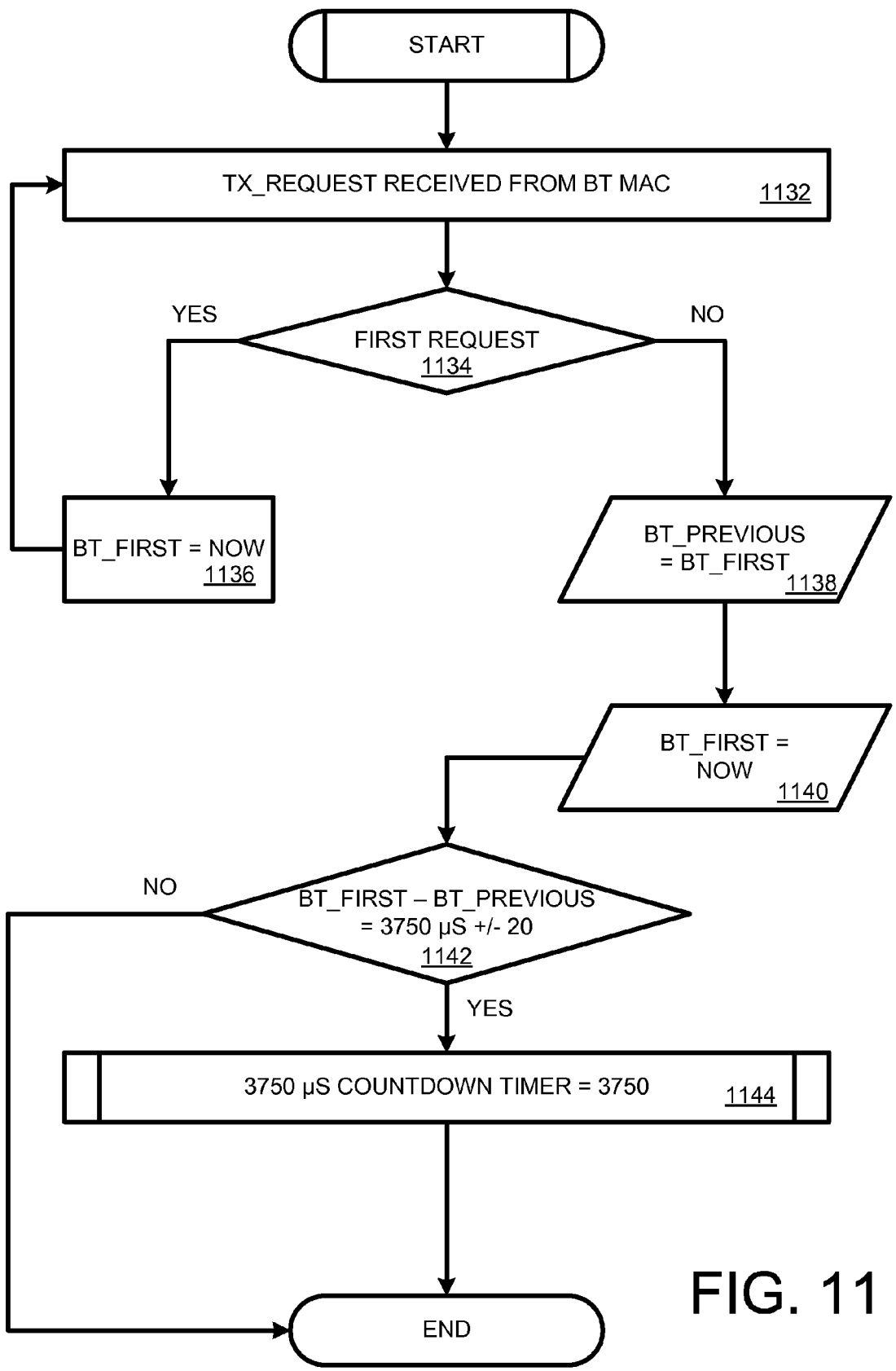
FIG. 11 is a flowchart illustrating an exemplary embodiment of a process that may be utilized in determining a time for sending 802.11 data, such as in the network from FIG. 1.

FIG. 11 is a flowchart illustrating an exemplary embodiment of a process that may be utilized predicting Bluetooth activity, which may be used in determining a time for sending 802.11 data, such as in the network from FIG. 1. As illustrated in the nonlimiting example of FIG. 11, the WLAN chipset 204 may be configured to receive a tx_request from the BT MAC component 214 (block 1132). The WLAN chipset 204 can then determine whether this is the first request (block 1134). If this tx_request is the first request, the WLAN chipset 204 sets a "BT_first" variable equal to a "now" variable (block 1136). This facilitates beginning capture of timing data for the transmitted Bluetooth data 306.

If, at block 1134, the WLAN chipset 204 determines that this is not the first request, a "BT_previous" variable is set to a "BT_first" variable (block 1138). The WLAN chipset 204 can also set a "BT_first" equal to the "now" variable (block 1140). The WLAN chipset 204 can then determine whether "BT_first" minus "BT_previous" equals 3750 μs, plus or minus 20 (block 1142). If not, the process may end. If, this equality is true, the WLAN chipset 204 sets the 3750 μs countdown timer to 3750 (block 1144). This timer can then be used to predict Bluetooth activity.

Figure 12:
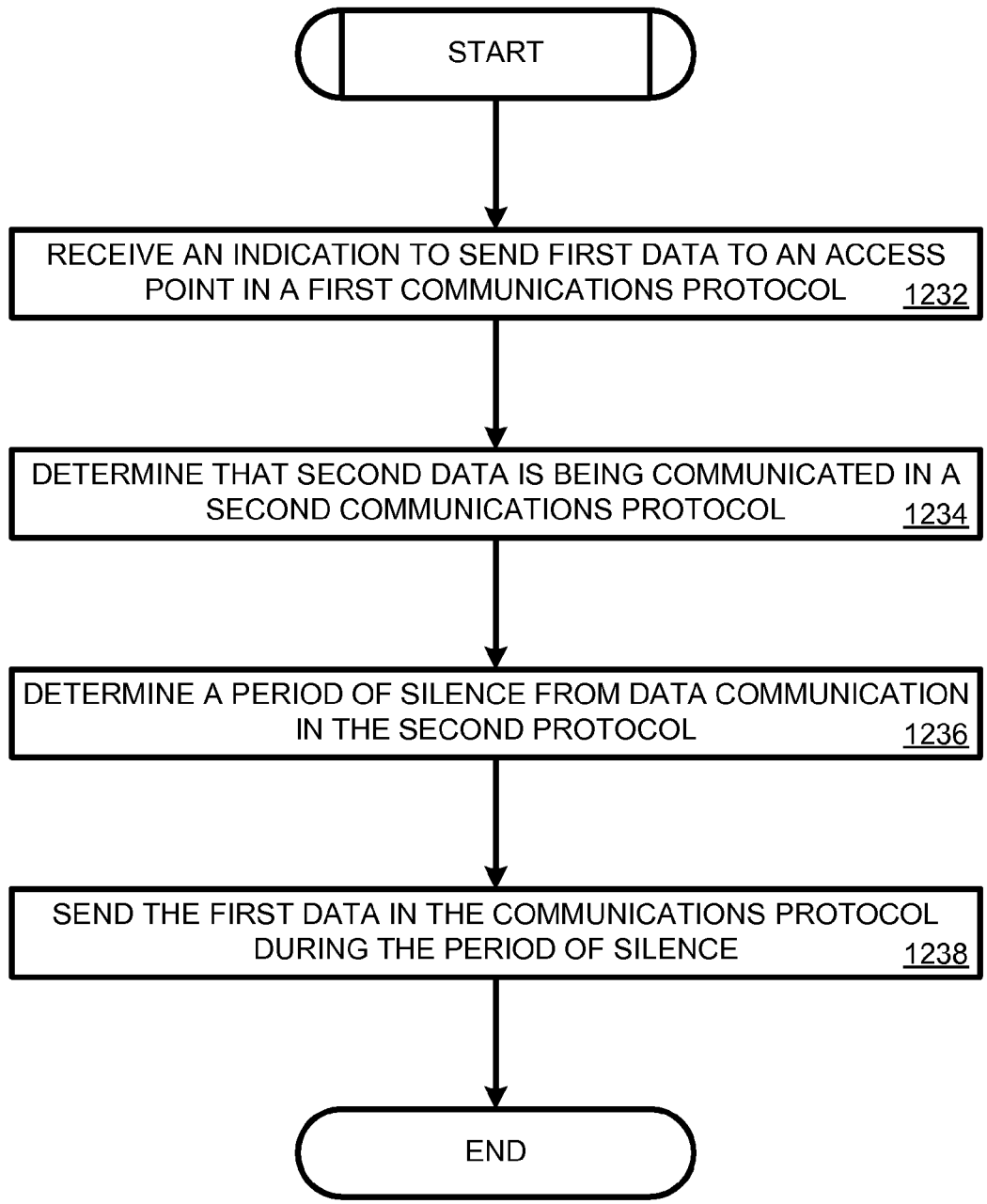
FIG. 12 is a flowchart illustrating an exemplary embodiment of a process that may be utilized in sending data in an environment with a plurality of protocols, similar to the flowchart from FIG. 11.

FIG. 12 is a flowchart illustrating an exemplary embodiment of a process that may be utilized in sending data in an environment with a plurality of protocols, similar to the flowchart from FIG. 11. As illustrated in the nonlimiting example of FIG. 12, a communications device 104 can receive an indication to send first data to an access point in a first communications protocol (block 1232). The indication can be in the form of a user command, however, other indications may also be received. The communications device 104 can then determine that second data is being communicated in a second communications protocol (block 1234). The communications device 104 can determine a period of silence from data communication in the second communications protocol (block 1236). The communications device 104 can send the first data in the communications protocol during the period of silence (block 1238).

One should note that, while the exemplary embodiment of FIG. 12 illustrates determination of the timing schedule for HV3 data 302, this is a nonlimiting example. More specifically, a similar process may be utilized for HV2 data frames 306 and/or other repetitively transmitted data. Additionally, depending on the particular configuration, other processes may be utilized for determining the timing schedule of Bluetooth data frames 306 (and/or other data).

The embodiments disclosed herein can be implemented in hardware, software, firmware, or a combination thereof. At least one embodiment disclosed herein may be implemented in software and/or firmware that is stored in a memory and that is executed by a suitable instruction execution system. If implemented in hardware, one or more of the embodiments disclosed herein can be implemented with any or a combination of the following technologies: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

One should note that the flowcharts included herein show the architecture, functionality, and operation of a possible implementation of software. In this regard, each block can be interpreted to represent a module, segment, or portion of code, which comprises one or more executable instructions for implementing the specified logical function(s). It should also be noted that in some alternative implementations, the functions noted in the blocks might occur out of the order and/or not at all. For example, two blocks shown in succession may in fact be executed substantially concurrently or the blocks may sometimes be executed in the reverse order, depending upon the functionality involved.

One should note that any of the programs listed herein, which can include an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, or transport the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a nonexhaustive list) of the computer-readable medium could include an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). In addition, the scope of the certain embodiments of this disclosure can include embodying the functionality described in logic embodied in hardware or software-configured mediums.

One should also note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of this disclosure. Many variations and modifications may be made to the above-described embodiment(s) without departing substantially from the spirit and principles of the disclosure. All such modifications and variations are intended to be included herein within the scope of this disclosure.

Therefore, at least the following is claimed:

1. A method for sending data in an environment with a plurality of protocols, comprising:

receiving, at a communications device, an indication to send first data to an access point in a first communications protocol;

determining that second data is being communicated in a second communications protocol;

determining a period of silence from data communication in the second communications protocol, wherein determining a period of silence comprises:
attempting to send the first data in the first communications protocol;
determining that the second data in the second communications protocol is currently being transmitted;
determining a time when the transmission of the second data will end;
entering a sleep mode until the determined time; and
sending the first data in the first communications protocol during the period of silence.

2. The method of claim 1, wherein the communications device is configured to enter a full power mode, a sleep mode, and a reduced power mode, wherein the reduced power mode is configured to power off at least one component of the communications device and wherein the sleep mode is configured to power off at least two components of the communications device.

3. The method of claim 2, further comprising entering the reduced power mode during communication of the second data in the second communications protocol.

4. The method of claim 2, wherein sending the first data in the first communications protocol includes entering the full power mode from at least one of the following: the sleep mode and the reduced power mode.

5. The method of claim 1, wherein the first communications protocol includes an 802.11b/g communications protocol.

6. The method of claim 1, wherein the second communications protocol includes a Bluetooth Protocol.

7. A communications device for receiving data in an environment with a plurality of protocols, comprising:
first determining logic configured to determine that an access point will send first data to the communications device in a first protocol;
second determining logic configured to determine that a Bluetooth device is transmitting second data in a second protocol;
third determining logic configured to determine a transmission schedule for the Bluetooth device for transmitting the second data in the second protocol; and
first sending logic configured to send, to the access point, an indication of the determined transmission schedule for transmitting the second data in the second protocol.

8. The communications device of claim 7, wherein the first sending logic is configured to send the indication as at least one of the following: a frame addressed to the access point and a frame not addressed to the access point.

9. The communications device of claim 7, further comprising:
first creating logic configured to create a network allocation vector (NAV) and utilize the NAV as the indication of the determined transmission schedule for transmitting the second data in the second protocol; and
receiving logic configured to receive the first data during a period of communicative silence of the Bluetooth device.

10. The communications device of claim 9, further comprising:
second creating logic configured to create a second network allocation vector (NAV); and second sending logic configured to send the second NAV to the access point with Transmission Control Protocol (TCP) data, wherein receiving the first data during the period of communicative silence of the Bluetooth device includes receiving an acknowledgement of receiving the TCP data.

11. The communications device of claim 10, wherein the second NAV is set via a clear to send (CTS) frame.

12. The communications device of claim 7, wherein sending the indication includes sending a first power management bit configured to indicate a start of transmission of the second data.

13. The communications device of claim 12, wherein sending the indication further includes sending a second power management bit configured to indicate an end of transmission of the second data.

14. A system for sending data in an environment with a plurality of protocols, comprising:
 a receiving component configured to receive an indication to transmit first data to an access point in a first communications protocol, the first protocol operating at a first frequency;
 a first determining component configured to determine that second data is being communicated in a second communications protocol, wherein the second communications protocol operates at a second frequency, the second frequency configured to interfere with the first frequency, the second data being communicated at regular intervals;
 a second determining component configured to determine a period of silence from data communication in the second protocol, wherein the second determining component is further configured to attempt to send the first data in the first communications protocol, determine that the second data in the second communications protocol is currently being transmitted, determine a time when the transmission of the second data will end, and enter a sleep mode until the determined time; and
 a sending component configured to send the first data in the first communications protocol during the period of silence.

15. The system of claim 14, wherein the system is configured to enter a full power mode, a sleep mode, and a reduced power mode, wherein the reduced power mode is configured to power off at least one component of a communications device and wherein the sleep mode is configured to power off at least two components of the communications device.

16. The system of claim 15, further comprising an entering component configured to enter the reduced power mode during communication of the second data in the second communications protocol.

17. The system of claim 15, wherein sending the first data in the first communications protocol includes entering the full power mode from at least one of the following: the sleep mode and the reduced power mode.

18. The system of claim 14, wherein the first communications protocol includes an 802.11b/g communications protocol.

19. A system for sending data in an environment with a plurality of protocols, comprising:
 means for receiving an indication to send first data to an access point in a first communications protocol;
 means for determining that second data is being communicated in a second communications protocol;
 means for determining a period of silence from data communication in the second communications protocol, wherein means for determining a period of silence from data communication further comprises:
  means for attempting to send data in the first communications protocol;
  means for determining that the second data in the second communications protocol is currently being transmitted;
  means for determining a time when the transmission of the second data will end;
  means for entering a sleep mode until the determined time; and
 means for sending the first data in the first communications protocol during the period of silence.

20. The system of claim 19, wherein means for receiving an indication is configured to receive the indication at a communications device configured to enter a full power mode, a sleep mode, and a reduced power mode, wherein the reduced power mode is configured to power off at least one component of the communications device and wherein the sleep mode is configured to power off at least two components of the communications device, and wherein means for sending the first data in the first communications protocol includes means for entering the full power mode from at least one of the following: the sleep mode and the reduced power mode.

21. The system of claim 20, further comprising means for entering the reduced power mode during communication of the second data in the second communications protocol.

* * * * *